No. 701,362. Patented June 3, 1902.
M. KURTH.
INSECT EXTERMINATOR.
(Application filed Mar. 8, 1902.)
(No Model.)
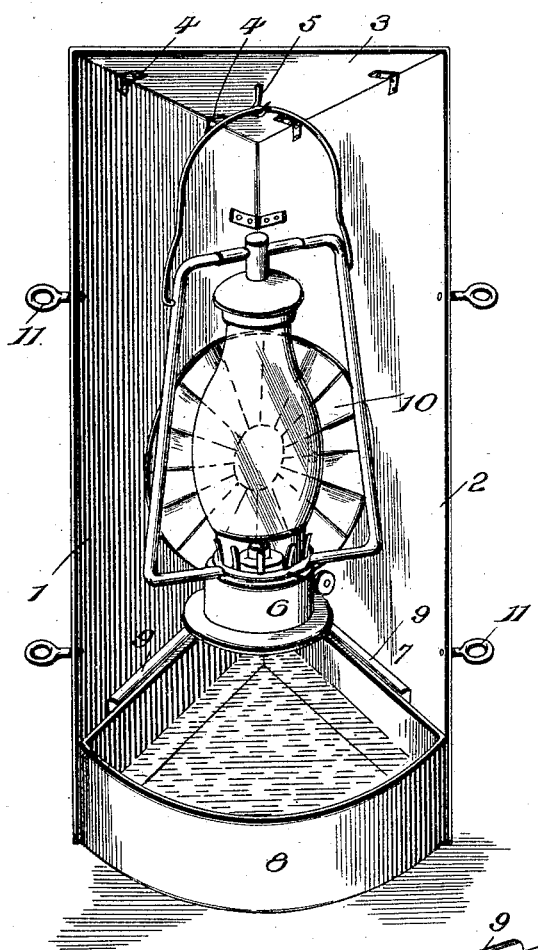
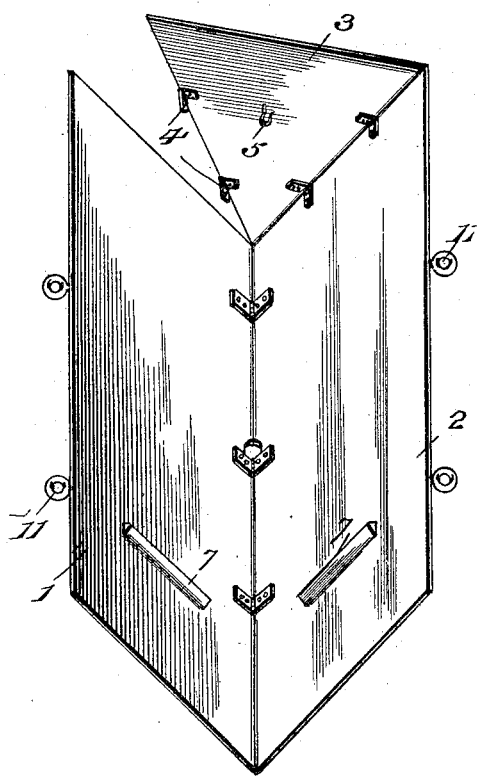
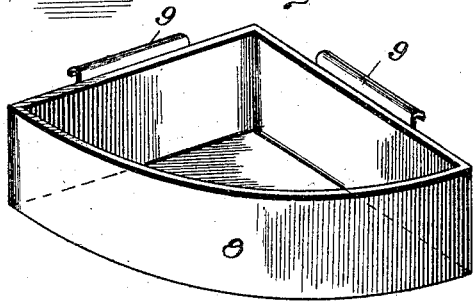
Inventor
Max Kurth.
Witnesses
By
His Attorneys.

UNITED STATES PATENT OFFICE.

MAX KURTH, OF ECCLES, MISSOURI.

INSECT-EXTERMINATOR.

SPECIFICATION forming part of Letters Patent No. 701,362, dated June 3, 1902.

Application filed March 8, 1902. Serial No. 97,341. (No model.)

*To all whom it may concern:*

Be it known that I, MAX KURTH, a citizen of the United States, residing at Eccles, in the county of Chariton and State of Missouri, have invented certain new and useful Improvements in Insect-Exterminators; and I do hereby declare the following to be a full, clear, and exact description of the invention, such as will enable others skilled in the art to which it appertains to make and use the same.

The present invention aims to provide a device of simple and novel construction for ridding fields and other places infested with winged insects of such pest, thereby preventing the loss commonly experienced by farmers and others engaged in raising crops of tobacco and other plants and fruit-bearing trees.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view in elevation of an exterminator embodying the invention. Fig. 2 is a perspective view of the frame having the pan and lamp removed and the top and side walls slightly opened. Fig. 3 is a perspective view of the pan.

Corresponding and like parts are referred to in the following description and indicated in all the views of the drawings by the same reference characters.

In its organization the exterminator comprises a frame, a lamp, and a pan, the latter containing the insecticide in liquid form. The frame comprises side walls 1 and 2, hinged or pivoted along one edge and arranged about at a right angle to each other when the device is in use. A top 3 closes the space formed between the walls 1 and 2 and is hinged at one edge to the upper end of one of the walls, as 2, and is provided at its opposite edge with fastenings 4 to make connection with the upper end of the other wall, as 1. A hook 5 is located about centrally of the top 3, and a lamp 6 of the lantern type or other form of construction is suspended therefrom. By having the side walls and top of the frame hingedly or pivotally connected the frame is adapted to fold into a compact form, so as to occupy the smallest amount of space, which is of advantage to the manufacturer and dealer, as space is economized. Supports 7 are located near the lower ends of the walls 1 and 2 for holding the pan 8 in place and may be of any desired construction. The inner faces or sides of the top and walls of the frame are finished in such a manner as to reflect light, and thereby materially assist in attracting the insects, which, flying against said walls, are stunned and drop into the pan and are killed by contact with the insecticide therein. The pan 8 is shallow and its front is curved and its sides are arranged approximately at a right angle, so as to fit close against the inner faces of the parts 1 and 2. Hook-shaped lips 9 project outward from the upper ends of the sides of the pan and are adapted to engage over the supports 7 and hold the pan in suspension. When in use the pan is nearly filled with water, and a small quantity of kerosene is floated thereon and constitutes the insecticide. The insects falling into the pan come in contact with the kerosene and are quickly killed.

The lamp 6, preferably of the lantern type, is suspended from the hook 5 above the pan 8 and when lighted attracts the insects, which fly toward the light and, striking the walls of the frame, drop into the pan, when life becomes extinct in the manner set forth. The part 10 is a reflector located in the angle formed between the sides 1 and 2, so as to throw the light outward to a greater distance, thereby increasing the efficiency of the contrivance as an insect-exterminator.

The device is located in the field or other place infested with the insects to be destroyed and for convenience is provided with eyes 11 at the front edges of the walls 1 and 2 for the reception of stakes or pins (not shown) driven into the ground at the place where it is desired to locate the exterminator.

Having thus described the invention, what is claimed as new is—

1. An insect-exterminator comprising a frame having angularly-disposed walls, a lamp located in the angle formed between the walls, a pan arranged below the lamp and in the angular space formed between the walls of the frame and adapted to contain an insecticide, and interlocking means between the subjacent sides of the pan and frame, substantially as set forth.

2. In an insect-exterminator, a frame comprising angularly-disposed side walls, a top for closing the space formed between said walls, a lamp suspended from the top between the side walls, supports near the lower ends of the side walls, and a pan having its sides fitted against the inner faces of the side walls and provided with off-standing hook-shaped lips to engage with the aforesaid supports and hold the pan in suspension beneath the lamp, substantially as set forth.

3. In an insect-exterminator, a folding frame comprising angularly-disposed walls hingedly connected at one edge, a top hinged to the upper end of one of the side walls and adapted to make detachable connection at the opposite edge with the other end of the other side wall, a lamp to be suspended from said top, and a pan located beneath the lamp and detachably connected with the sides of the frame, substantially as set forth.

4. The herein-described insect-exterminator comprising side walls hinged at their rear vertical edges, a top hinged to the upper end of one of the sides and provided at its opposite edge with fastenings to make detachable connection with the upper end of the other side, rings near the front edges of the sides, supports near the lower ends of the sides, a lamp suspended from the top between the side walls, a reflector located in the angle formed between the said sides, a pan having its sides angularly disposed and adapted to come close against the sides of the frame, and hook-shaped lips projected from the sides of the pan to make interlocking connection with the aforementioned supports for holding the pan in suspension, substantially as specified.

In testimony whereof I affix my signature in presence of two witnesses.

MAX KURTH. [L. S.[

Witnesses:
J. F. PRATT,
LAURA B. JOHNSON.